(12) United States Patent  (10) Patent No.: US 7,530,884 B2
Parillo et al.  (45) Date of Patent: May 12, 2009

(54) SYSTEM AND METHOD FOR DUPLICATING KEYS

(76) Inventors: Michael Parillo, 986 Route 130 North, North Brunswick, NJ (US) 08902; Edward Baker, 38 Livingston La., Manalapan, NJ (US) 07726

( * ) Notice: Subject to any disclaimer, the term of this patent is extended or adjusted under 35 U.S.C. 154(b) by 56 days.

(21) Appl. No.: 11/646,140

(22) Filed: Dec. 27, 2006

(65) Prior Publication Data

US 2007/0105484 A1  May 10, 2007

Related U.S. Application Data

(63) Continuation-in-part of application No. 10/373,443, filed on Feb. 25, 2003, now Pat. No. 7,210,986, which is a continuation-in-part of application No. 09/792,378, filed on Feb. 23, 2001, now abandoned.

(51) Int. Cl.
*B24B 1/00* (2006.01)
*B23C 1/16* (2006.01)

(52) U.S. Cl. .............................. 451/45; 76/110; 409/81; 451/125; 451/237; 451/452

(58) Field of Classification Search ................... 76/110; 409/81, 82, 132; 451/45, 125, 178, 231, 451/237, 238, 312, 451, 452, 457
See application file for complete search history.

(56) References Cited

U.S. PATENT DOCUMENTS

| | | | | |
|---|---|---|---|---|
| 983,787 A | * | 2/1911 | Wakeland | 409/81 |
| 1,750,218 A | * | 3/1930 | Falk | 409/81 |
| 1,775,921 A | * | 9/1930 | Williams | 409/81 |
| 1,948,260 A | * | 2/1934 | Fowler | 409/81 |
| 3,675,536 A | * | 7/1972 | Hungerford et al. | 409/83 |
| 3,807,276 A | * | 4/1974 | Oliver | 409/81 |
| 3,902,382 A | * | 9/1975 | Lieptz | 76/110 |
| 4,051,748 A | * | 10/1977 | Sherman | 76/110 |
| 4,657,448 A | * | 4/1987 | Alexander | 409/81 |
| 6,033,164 A | * | 3/2000 | Hoffman et al. | 409/81 |

* cited by examiner

*Primary Examiner*—Timothy V Eley
(74) *Attorney, Agent, or Firm*—Brian K. Dinicola

(57) ABSTRACT

A key duplication system employs a modular key duplication attachment in combination with a high-speed, rotary powered tool and a profiled abrasive cutter. The attachment comprises a base, a carriage assembly movable relative to the base, a profiled stylus secured to the base, a first clamping vise for retaining a specimen key at a fixed (i.e., stationary) position relative to the carriage assembly and a second clamping vise for retaining a key blank at a fixed position relative to the carriage assembly. When so-retained, a bottom flat surface of the specimen key and a bottom flat surface of the key blank rest in a common working plane and the tip of each key is separated by a first distance. The cutter and stylus are aligned and secured to the base such that movement of the carriage, relative to the base, simultaneously brings them both into contact with appropriate surfaces of the key blank and the specimen key, respectively.

10 Claims, 3 Drawing Sheets

SYSTEM AND METHOD FOR DUPLICATING KEYS

REFERENCE TO RELATED APPLICATIONS

This application is a continuation-in-part of U.S. patent application Ser. No. 10/373,443, filed on Feb. 25, 2003 now U.S. Pat. No. 7,210,986 entitled "System and Method for Duplicating Keys", which is a continuation-in-part of U.S. patent application Ser. No. 09/792,378 filed on Feb. 23, 2001 and entitled "Key Duplication Attachment Device For Rotary Tool With Profiled Abrasive Cutter", now abandoned.

BACKGROUND OF THE INVENTION

1. Field of the Invention

This invention relates generally to key duplication and, more particularly, to a method of using portable, rotary tool to power a system adapted to machine one or more key blanks to thereby produce a corresponding number of duplicates of an original key.

2. Discussion of the Background Art

The need to fabricate duplicate keys undoubtedly dates back to the earliest implementation of the lock. As such, the earliest methods of making duplicate keys were the exclusive province of skilled artisans who used files and other hand tools to slowly shape a small section of metal into the desired key form. The electric motor, of course, made it possible to mechanize the process of forming and shaping duplicate keys, and a key of moderate complexity can typically be duplicated—by a relatively unskilled worker—in a matter of minutes. Since its introduction and subsequent widespread commercial acceptance, however, the mechanized key duplication system has changed very little over the years.

In a conventional key duplication system, a specimen key with the essential pattern profile (i.e., an "original" key) is placed into a first vise clamp. A key blank to be contoured with the essential pattern is placed into a juxtaposed second vise clamp. The specimen key is brought into contact with a guiding stylus, while the key blank is brought into contact with a belt-driven cutting wheel dimensioned and arranged to revolve at approximately 450 to 1700 rpm. A carriage associated with the vise clamps is then shifted laterally and angularly reoriented inwardly and outwardly, such that the engagement of the specimen key with the stylus imparts a corresponding pivotal movement of the carriage and the teeth of the cutting wheel cut a corresponding contour pattern into the key blank. When this process has concluded, the key blank is removed from the vise clamps, and any burrs or other imperfections formed during the cutting operation are removed with a file or a buffing wheel.

Notwithstanding the widespread commercial use of conventional key duplication systems, there are several deficiencies associated with them. For example, the belt system used to drive the rotating cutting wheel is subject to a substantial amount of slip, reducing its efficiency and precision. Wear in the pivot points that support the key clamping vises further diminishes the precision required to produce a usable working key. The impact of the cutting teeth against the blank key, repeated many times during a single duplicating operation, may force a key requiring deep cuts, lands and/or contours to shift or jump out of even the most securely tightened clamping vise jaws. Efforts to compensate for this tendency have involved elaborate clamping vise jaw configurations, but this approach has met with only limited acceptance because the lands and grooves of many keys are lower than the top edge of the "improved" vise jaws—preventing their duplication.

The need to accommodate many modern key configurations have exposed further limitations in the design of conventional key duplicating equipment. For example, the ignition keys for many domestic and foreign vehicles are double sided with lands and grooves on the lip extension of both sides. Most keys contain one or more extended steps on each side. When duplicating keys of this type, the step(s) must rest on the top surface of the vise clamp jaws, while the lip must extend between the jaws of the vise. After one side of such a key is cut, the lip may become too short to grip securely while cutting the other side. Thus, there is an increased risk that the force of the impact—from the cutter against the blank being duplicated—will cause a shifting or throwing out of the key blank. Not surprisingly, conventional key duplicating machines produce a high percentage of unusable duplicate keys.

Still other disadvantages associated with conventional key duplicating equipment include the development of unnatural high pitched sounds injurious to the operator's hearing, and the dulling or breakage of the heat-treated tool steel cutting teeth. In fact, cutting tooth breakage is so common that despite the widespread use of steel keys, a major manufacturer of key cutting wheels warns that its cutters should not be used to cut steel keys.

A continuing need therefore exists for a key duplicating system which is simple to operate, inexpensive to fabricate, and accurate enough to produce usable duplicate keys. A continuing need also exists for a key duplication system that is both portable and modular in construction so that it may be used in conjunction with an existing rotary power tool.

SUMMARY OF THE INVENTION

The aforementioned needs are addressed, and an advance is made in the art, by a key duplication system that employs a modular key duplication attachment device specifically adapted for use in combination with a high-speed, rotary powered tool and a profiled abrasive cutter.

In accordance with an illustrative embodiment of the present invention, the key duplication attachment device comprises a base assembly, a carriage assembly movable relative to the base, a profiled stylus secured to the base, a first clamping vise securable to the carriage and dimensioned and arranged to retain a specimen key at a first fixed (i.e., stationary) position relative thereto and a second clamping vise securable to the carriage and dimensioned and arranged to retain a key blank at a second fixed position relative thereto and to the specimen key. When so-retained, a bottom flat surface of the specimen key and a bottom flat surface of the key blank rest in a common plane and the tip of each key is separated by a first distance.

The base assembly further defines an opening dimensioned and arranged to receive and retain a high-speed, rotary power tool in a fixed position relative to the stylus and a working zone. The key duplication system of the present invention further includes a profiled abrasive cutter adapted to be rotated, at a high rate of speed, by the rotary power tool. The abrasive cutter and carriage assembly opening are dimensioned and arranged so that when the high-speed, rotary power tool is retained within the opening, the corresponding engagement surfaces of the profiled abrasive cutter and the profiled stylus are aligned. Specifically, the cutter and stylus are aligned such that movement of the carriage, relative to the base, simultaneously brings them both into contact with appropriate surfaces of the key blank and the specimen key, respectively. To this end, the respective engagement surfaces of the stylus and abrasive cutter are separated by the same distance as the tips of the specimen key and key blanks.

In operation, the carriage is manipulated by the operator so as to bring the stylus into contact with the specimen key. In accordance with an illustrative embodiment of the invention, the carriage is hingedly secured to the base so that the specimen key may be swung into and out of engagement with the stylus. At the same time, key blank is brought into engagement with the abrasive cutter, which is rotating at a high speed. The resulting grinding action quickly removes material from the key blank. The carriage is also configured for lateral (linear) movement relative the base, so that the engagement surface of the stylus may be brought into engagement with the specimen key at any point along its length. As will be readily appreciated by those skilled in the art, the corresponding movement of the abrasive cutter results in a duplicate key having the same contour as the specimen key.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The invention will be better understood by reference to the detailed description of the invention that follows, taken in conjunction with the accompanying drawings, in which.

DETAILED DESCRIPTION OF THE INVENTION

Figure 1:
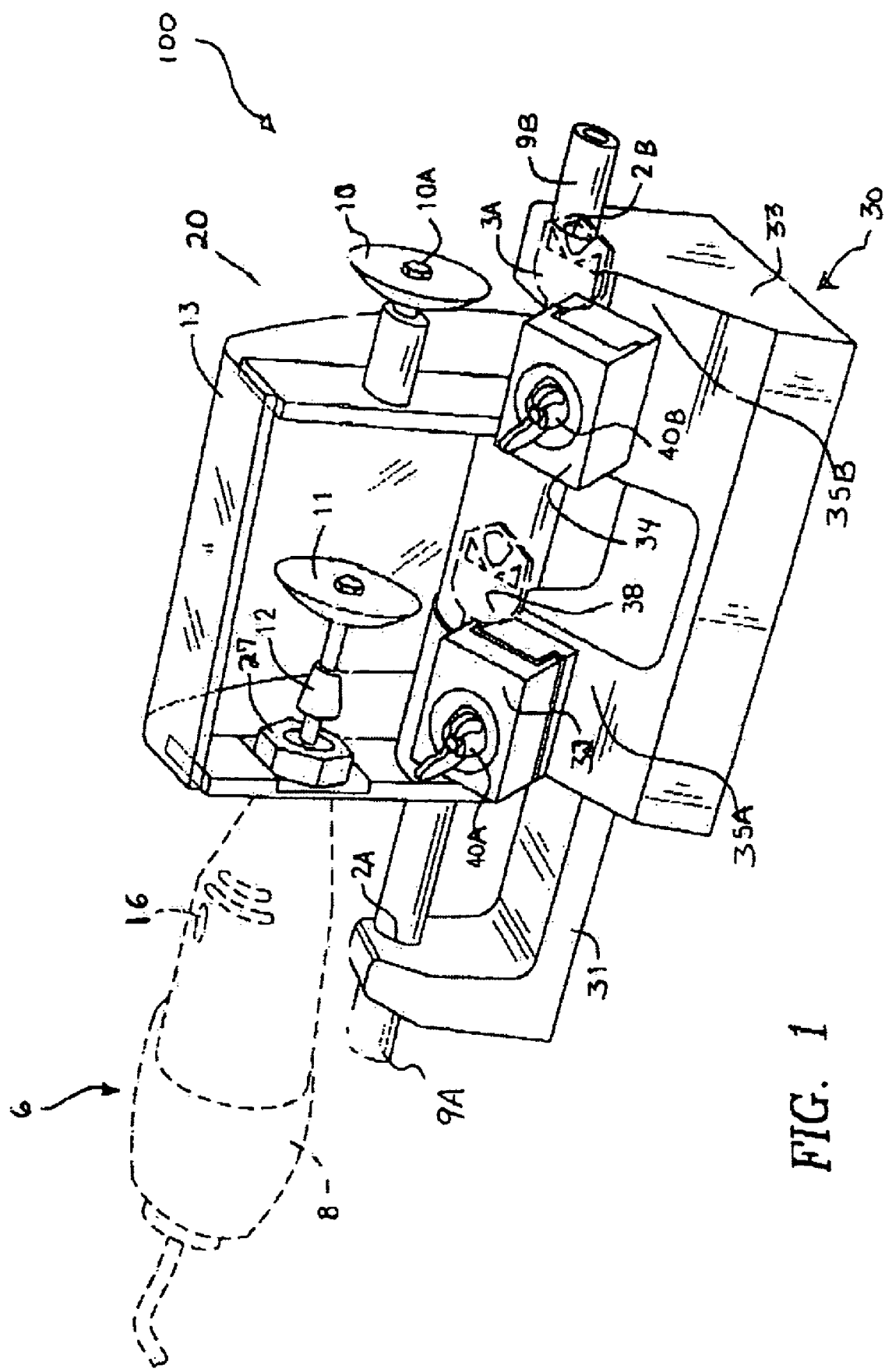
FIG. 1 is a perspective view of a fully assembly key duplication system constructed in accordance with an illustrative embodiment of the present invention.

With initial reference to FIG. 1, there is shown an improved key duplicating system 100 constructed in accordance with an illustrative embodiment of the present invention. As seen in FIG. 1, key duplicating system 100 includes a carriage assembly indicated generally at reference numeral 20 and a stationary base indicated generally at reference numeral 30. Together, carriage assembly 20 and stationary base 30 constitute a key duplicating attachment or module adapted, as will be explained in greater detail shortly, for use in conjunction with a high speed motor such, for example, as that normally found in a conventional, high-speed rotary tool. An illustrative rotary tool, indicated generally at reference numeral 6 in FIG. 1, is shown in dotted line form and includes an elongated dielectric housing 8 having a threaded tip, an on/off switch 16, and a central shaft adapted to rotate at speeds of at least 8,000 to 30,000 rpm. To the central shaft is attached a conventional retaining element or chuck 12.

Rotary hand-held tools such as that depicted in FIG. 1 are especially preferred because they are common tools that are frequently used for a variety of work tasks around the house and workplace. The versatility of such rotary hand-held tools and interchangeability of bits has made these tools very popular in the marketplace. As will be readily appreciated by those skilled in the art, housing 8 of hand-tool 6 is typically annular in cross section and dimensioned to be manually grasped for manipulation. The housing 8 contains a motor (not shown) and a rotary output at its front end shown as a chuck or collet (not shown) that is extended by a surface engaging bit (not shown) when attached. The collet is driven about a tool axis by the motor and provides for ready attachment and detachment from the surface engaging bit which is used to engage a working surface. Also at the front end, the housing 8 defines a threaded attachment tip (not shown) which can be used to removably attach various adjunct structures, such as the key duplication arrangement disclosed herein. Alternate adjunct structures include the so-called "cutting guides", which may be used in such applications as dry wall cutting to cut holes for electrical switches, outlets and the like. An exemplary surface positioning guide is disclosed in U.S. Pat. No. 6,244,796 to Schuebel et al. The '796 patent generally discloses a surface positioning guide that is angled and includes groove tabs to facilitate use of the rotary tool for such applications as grout removal.

Figure 2:
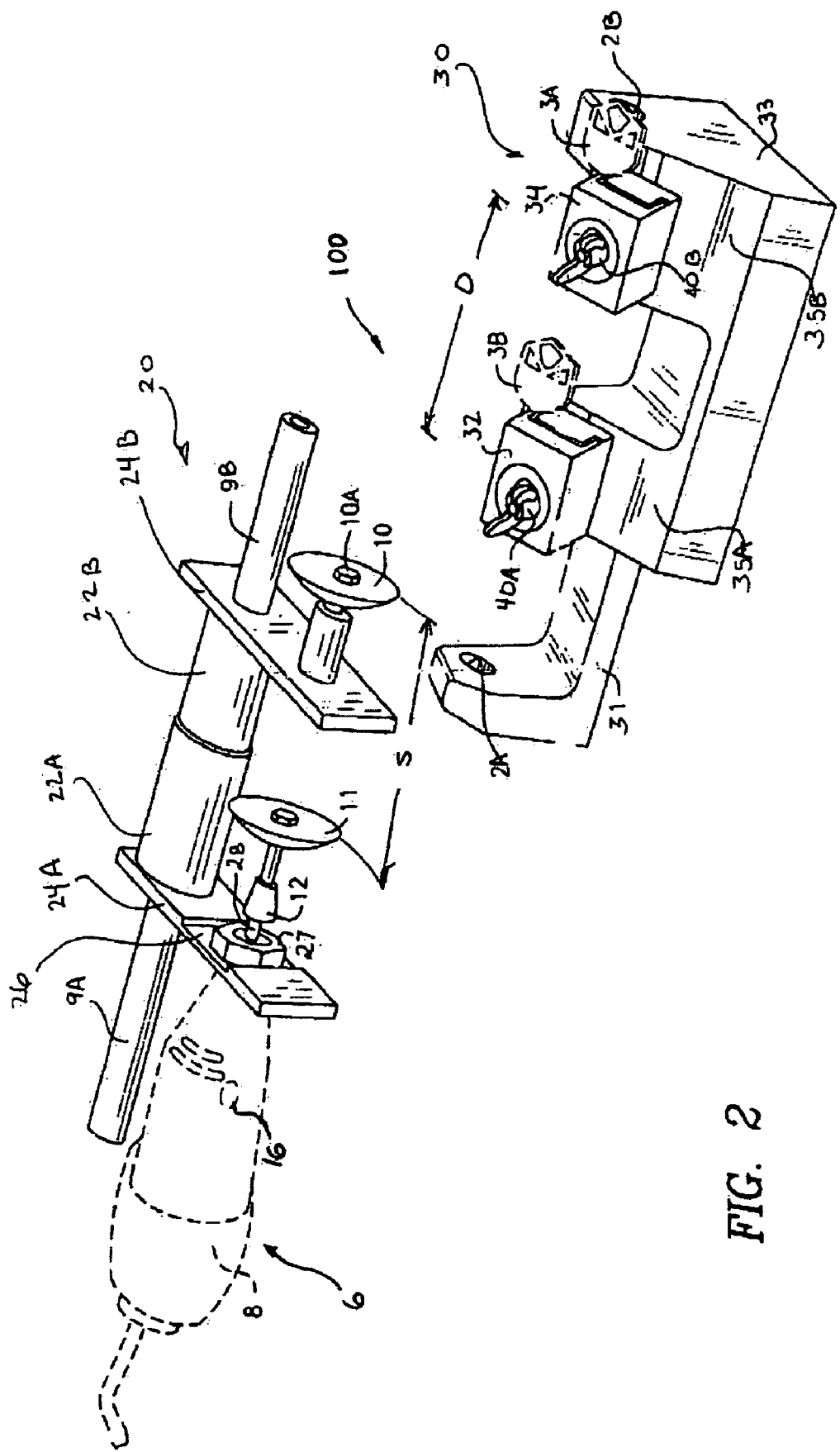
FIG. 2 is an exploded perspective view of the illustrative embodiment of FIG. 1, with the carriage being depicted with its safety cover removed and separated from the base.

Turning briefly to FIG. 2, it will be seen that carriage assembly 20 is an elongated structure which includes a pair of horizontal journals 9A and 9B respectively dimensioned and arranged for insertion into corresponding bearing supports 2A and 2B that are defined at opposite ends of stationery base 30. For a reason that will soon become readily apparent, this arrangement accommodates both linear and angular translation of carriage assembly 20 relative to stationary base 30. In the illustrative embodiment of FIGS. 1 and 2, carriage assembly 20 is divided into telescoping first and second sections 22A and 22B. As will be readily appreciated by those skilled in the art, this telescoping configuration enables journals 9A and 9B to be moved inwardly into a compact position permitting their alignment with bearing supports 2A and 2B. Journals 9A and 9B are thereafter spread apart until they are fully extended into the positions shown in FIG. 1. A suitable locking mechanism such as a set screw or the like (not shown) is used to maintain sections 22A and 22B in the spread apart position shown. It should be noted that the aforementioned telescoping journal configuration is described by way of illustrative example only and that other attachment configurations are also possible. Indeed, by way of additional example, base extension arm 31, which defines bearing support 2A, can be implemented as a structure that is linearly adjustable relative to primary base section 33.

In any event, and with continued reference to FIG. 2, it will be seen that carriage assembly 20 further includes a pair of parallel retaining arms 24A and 24B. Retaining arm 24A defines a reduced-thickness mounting region 26 through which a mounting bore (not shown) extends. Attachment of rotary tool 6 to carriage assembly 20 is achieved by inserting the threaded tip of dielectric housing 8 through mounting region 26 and then tightening threaded locking nut 27. A profiled abrasive cutting element indicated generally at 11 is retained within a chuck 12 affixed to the rotary shaft 28 of rotary tool 6. Profiled stylus 10 is adjustably secured to retaining arm 24B by bolt and lock nut assembly 10A.

With continuing reference to FIG. 2, it will be seen that a key blank 3B is secured to the stationary base at a first location and an original key 3A is secured to the stationary base at a second location. In the illustrative embodiment depicted in FIGS. 1 and 2, the key blank and original key are secured by first and second clamping devices indicated generally at 32 and 34, respectively. Both the key blank and the original key are retained at a fixed distance relative to one another and also at a fixed angular orientation relative to one another (that is, they lie in a common plane). Preferably, clamps 32 and 34 are mounted at an incline relative to an underlying horizontal support surface so that only small angular movements of carriage assembly 20 are needed and so that the operator can observe the key duplication progress without undue strain. To this end, primary base section 33 defines first and second inclined mounting surfaces 35A and 35B dimensioned and arranged to support clamping devices 32 and 34, respectively. Clamping devices 32 and 34 themselves are configured, in the illustrative embodiment of FIGS. 1 and 2, as vises secured by clamp-vise wing nuts 40A and 40B.

Returning now to FIG. 1, it will be appreciated that the journals 9A and 9B within guide bearing supports 2A and 2B allow for the swinging upwardly and downwardly of carriage assembly 20 relative to base assembly 30. As such, profiled abrasive grinding element 11 and profiled stylus 10 may be brought into and out of engagement with corresponding surfaces of the key blank and original key. A transparent safety cover indicated generally at 13 is securable to the carriage and adapted for angular and linear movement therewith. Transparent cover 13 is dimensioned and arranged to act as a shield covering the key and key blank when stylus 10 and cutting element 11 are moved into engagement with the original key and key blank, respectively.

Operation of the system 100 proceeds after the appropriate power rotary tool as tool 6 is attached to retaining arm 24A. In that regard, the rotary tool may be powered by 120 V A/C single phase household line current, by a battery source, or even by pneumatic means (e.g., compressed air). Securing nut 27 is turned clockwise to secure rotary tool 6 to carriage assembly 30. The profiled abrasive key grinder arbor assembly 11 is slipped into the tool chuck 12, with lateral alignment being controlled by an increased diameter stop on the arbor of the grinder cutter assembly 11 that is tightened securely in tool chuck 12.

Original or specimen key 3A is positioned within vise clamp 34 and key blank 3B is positioned within vise clamp 36. The vise clamps are tightened by rotating respective wing nuts 40A and 40B. To align specimen key 3A with key blank 3B, the profiled stylus 10 is brought into engagement with an extension on the key called the key shoulder and/or the tip end of the keys. This results in a precise lengthwise positioning of specimen key 3A relative to key blank 3B. The lengthwise spacing D (FIG. 2) between the tips or other corresponding alignment surfaces is exactly matched by the lengthwise spacing S (FIG. 1) between the flat side surfaces of the profiled abrasive rotary grinder 11 and stylus 10.

To achieve the corresponding exact spacing, the telescoping capability of carriage assembly sections 22A and 22B can be readily exploited. That is, the relative distance and angular orientation of abrasive grinding element 11 may be readily adjusted relative to stylus 10 by loosening the set screw (not shown) and then swiveling and/or sliding sections 22A and 22B relative to one another as necessary to obtain the requisite spacing and alignment. By way of illustration, the stylus is first brought into contact with a selected reference surface region along specimen key 3A. Then, section 22A is slid linearly and/or angularly relative to section 22B until abrasive grinding element 11 is brought into contact with the corresponding target surface region on key blank 3B.

Advantageously, the dielectric housing 8 of rotary tool 6 can serve as the graspable handle for angularly and linearly moving carriage assembly 20 relative to base 30. Alternatively, a separate handle may be attached to retaining member 24A or other portion of carriage assembly 20. In either event, the carriage is controllably moved so as force grinding element 11 into contact with the blank key and stylus 10 into contact with specimen key 3A. High speed (e.g. 8,000 to 40,000 rpm) rotation of the rotary shaft causes the abrasive grinding element to cut grooves and other reference surface features of specimen key 3A into the surface of key blank 3B.

Figure 3:
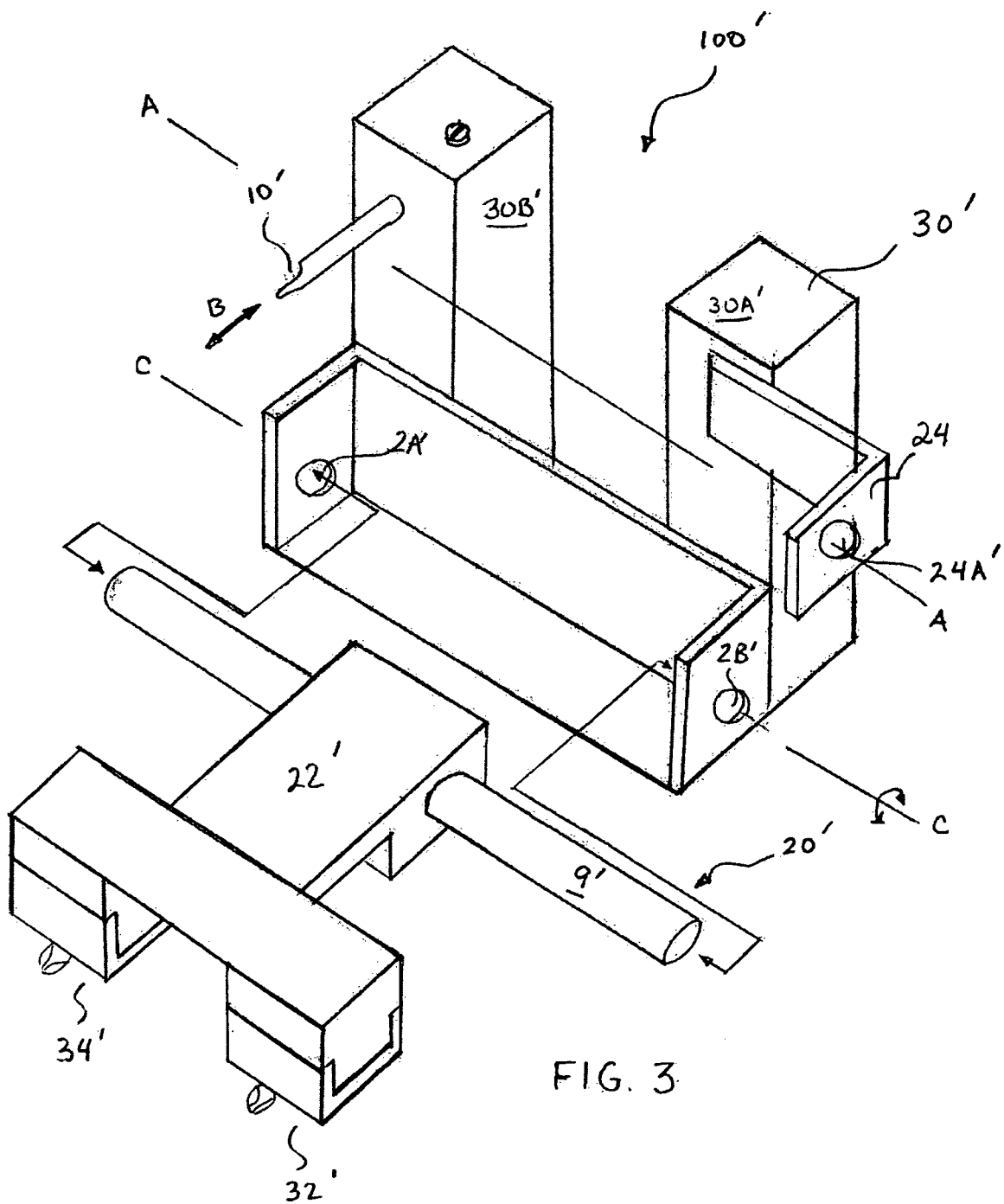
FIG. 3 is an exploded perspective view of an alternate embodiment of the present invention, in which the base includes an attachment assembly for maintaining a rotary tool in a fixed orientation and in which the angularly and linearly movable carriage includes first and second clamps for retaining an original key and key blank.

Turning now to FIG. 3, there is shown an alternate embodiment of the present invention. Essentially, the key duplication system 100' depicted in FIG. 3 differs from the arrangement of FIGS. 1 and 2 in that it is the rotary tool as tool 6 which is retained in a fixed position defining a rotary tool axis A while the original key and key blank are moved linearly and angularly with respect to the stylus 10' and cutting element (not shown). To this end, system 100' includes a free-standing base assembly 30' defining a lower surface dimensioned and arranged to rest upon a substantially planar support surface, and two vertically extending post sections 30A' and 30B'. Base 30' further includes a retaining structure 24' dimensioned and arranged to retain and support a rotary power tool, as tool 6 of FIGS. 1 and 2, the retaining structure 24' defining an aperture 24A' that is dimensioned and arranged to receive an end portion of the tool's rotary shaft. In the illustrative embodiment of FIG. 3, the retaining structure 24A' is configured as an L-shaped bracket element having a first leg secured to first upwardly extending post 30A' of structure 24' and a second leg extending orthogonally to the first leg.

With continued reference to FIG. 3, it will be seen that base 30' further includes a stylus 10' that is slidably received within a bore within second vertical post section 30B'. A set screw 32' allows stylus 10' to be moved linearly into or away from the working zone along the path B. As will be readily appreciated by those skilled in the art, such an arrangement enables the tip of stylus 10' to be precisely aligned in accordance with the profile of a cutting element (as cutting element 11 of FIGS. 1 and 2) driven by a rotary tool whose shaft extends through aperture 24A'. Accordingly, stylus 10' has a surface region dimensioned and arranged to contact a selected corresponding surface region of an original key when the end portion of the rotary shaft extends through aperture 24A' and is secured to retaining structure 24' to thereby bring the cutting element and stylus into working alignment.

The arrangement of FIG. 3 further includes a carriage 20' that is movable linearly and angularly relative to base 30', the stylus 10', and the cutting element retained by an attached rotary tool (not shown). Carriage 20' includes a first clamp 32' dimensioned and arranged to receive and retain a key blank (not shown) and a second clamp 34' dimensioned and arranged to receive and retain an original key (not shown), whereby upon angular orientation of carriage 20' to bring a profiled surface of a retained original key into contact with the surface region of the stylus 10' during operation of the rotary tool, unwanted portions of a retained key blank are removed to thereby produce a duplicate key. Carriage 20' further includes a shaft 9' which, when inserted into aligned apertures 2A' and 2B' of base 30', accommodates both limited linear translation (i.e., left-to-right and right-to-lift) and limited angular orientation about working axis C-C. An arm member indicated generally at 22' retains clamps 32' and 34' in a fixed relationship relative to shaft 9'.

A method of utilizing the key duplicating system of FIG. 3 includes the steps of (1) providing a rotary tool characterized by an elongated dielectric housing, a motor, a rotary shaft in driven engagement with the motor, a non-rotatable threaded tip portion surrounding an end of the rotary shaft, and a rotatable threaded tip portion driven by the rotary shaft and dimensioned and arranged to receive a chuck, and a threaded cap having threads for mating engagement with the non-rotatable threaded tip portion; (2) unthreading the threaded cap; (3) inserting the non-rotatable threaded tip portion through aperture 24A' in retaining structure 24' and tightening a locking nut around said non-rotatable threaded tip portion to thereby retain the rotary tool in a fixed orientation relative to a working zone of the key duplicating system; (4) securing a cutting element to the rotatable threaded tip portion; (5) adjusting the location of the stylus 10' so that the key contacting tip region thereof extends the same distance from the rotary axis of the tool as the material removing surface of the cutting element; (6) inserting a key blank into a first clamp alignable with the cutting element and inserting an original key to be duplicated into a second clamp alignable with stylus 10'; (7) energizing the rotary tool via its on/off switch; and (8) angularly and linearly translating a carriage so as to bring the original key and key blank into contact with the stylus 10' and cutting element, respectively and to thereby remove sufficient material from the key blank as to create a duplicate key.

As used herein, the phrase "abrasive cutting element" refers to a rotary element having an abrasive surface that is dimensioned and arranged to remove material from a key blank solely by abrasion. Specifically excluded from this definition, then, are cutting element surfaces that remove material from the key blank by milling action. The operative surface of the abrasive cutting element may, for example, be obtained by coating a profiled structure otherwise identical to stylus 10 with a conventional abrasive material as, for example, particles of silicon carbide, aluminum oxide.

From the foregoing, it will be appreciated that the use of a profiled abrasive grinding or cutting element, rotated by a rotary power tool so as to produce cutting surface speeds ranging from 8,000 to 30,000 rpms without overheating—in conjunction with a key duplication attachment system constructed in accordance with the present invention—affords many advantages over conventional duplicating systems. The duplicating operation requires considerably less time, and the system can be used to grind-cut keys made of steel, brass, iron. No high pitch sounds are emitted that would eventually injure one's hearing. A more accurate duplication of the pattern contour from the specimen key results, with cleaner, sharper grinding of the contour pattern, while the force imparted to the key blank is substantially reduced, thereby increasing the stability of the clamping vise. The need for complex and cumbersome mechanisms for automatic feed cutting and tracing, a common feature of conventional duplication machines and devices, is entirely avoided.

What is claimed is:

1. A method of forming a duplicate of an original key from a key blank, comprising the steps of:
   providing a rotary tool characterized by an elongated dielectric housing, a motor, a rotary shaft in driven engagement with the motor, a non-rotatable threaded tip portion surrounding an end of the rotary shaft, and a rotatable threaded tip portion driven by the rotary shaft and a threaded cap in threaded mating engagement with the non-rotatable threaded tip portion;
   providing a key duplication system having a free-standing base assembly defining a lower surface dimensioned and arranged to rest upon a substantially planar support surface, the retaining structure being dimensioned and arranged to retain and support the rotary power tool and including a stylus supported at an elevation above the lower surface, the stylus having a surface region dimensioned and arranged to contact a selected corresponding surface region of an original key when the end portion of the rotary shaft extends through the aperture to thereby bring the cutting element and stylus into working alignment; and a carriage movable linearly and angularly relative to the base, the stylus, and the cutting element, the carriage including a first clamp dimensioned and arranged to receive and retain a key blank and a second clamp dimensioned and arranged to receive and retain an original key;
   unthreading and removing the threaded cap; inserting the non-rotatable threaded tip portion through the aperture and securing a locking nut around the non-rotatable threaded tip portion to thereby retain the rotary tool in a fixed orientation relative to a working zone of the key duplicating system;
   securing a cutting element to the rotatable threaded tip portion;
   inserting a key blank into the first clamp and inserting an original key to be duplicated into the second clamp alignable;
   energizing the rotary tool; and
   angularly and linearly translating the carriage so as to bring the original key and key blank into contact with the stylus and cutting element, respectively and to thereby remove sufficient material from the key blank as to create a duplicate key.

2. The method of claim 1, further including a step of adjusting the location of the stylus so that a key contacting region thereof extends a same distance from a rotary axis of the tool as a material removing surface region of the cutting element.

3. The method of claim 1, wherein the energizing step includes operating said rotary tool at a speed of 8000 to 30000 rpm.

4. The method of claim 1, wherein the step of securing a cutting element comprises inserting a cutting element having substantially the same cross-sectional profile as the stylus.

5. The method of claim 4, wherein the cutting element is an abrasive cutting element.

6. A key duplication system for fabricating a duplicate of an original key from a key blank comprising, in combination:
   a free-standing base assembly defining a lower surface dimensioned and arranged to rest upon a substantially planar support surface, said base including a retaining structure dimensioned and arranged to retain and support a rotary power tool having a high speed motor disposed within a proximal portion of an elongated dielectric housing, a rotary shaft extending through a distal portion of said elongated dielectric housing and driven by said high speed motor so as to rotate about a longitudinal axis extending through said distal portion, and a cutting element secured to said rotary shaft, said retaining structure defining an aperture that is dimensioned and arranged to receive an end portion of said rotary shaft and that is disposed within a plane orthogonal to said lower surface; and
   a stylus supported by said base at an elevation above said lower surface, said stylus having a surface region dimensioned and arranged to contact a selected corresponding surface region of an original key when the end portion of said rotary shaft extends through said aperture to thereby bring the cutting element and stylus into working alignment; and a carriage movable linearly and angularly relative to said base, said stylus, and said cutting element, said carriage including a first clamp dimensioned and arranged to receive and retain a key blank; and a second clamp dimensioned and arranged to receive and retain an original key, whereby upon angular orientation of the carriage to bring a profiled surface of a retained original key into contact with the surface region of the stylus during operation of the rotary tool, unwanted portions of a retained key blank are removed to thereby produce a duplicate key;

wherein said high speed motor is disposed within an elongated dielectric housing of a rotary power tool, said dielectric housing defining a hand-graspable surface region arranged concentrically about an axis of rotation defined by the rotary shaft and motor; and wherein said dielectric housing has a non-rotatable threaded tip concentrically arranged about said rotary shaft and wherein said system further includes a correspondingly threaded locking nut dimensioned and arranged to secure the dielectric housing to said base upon insertion of said threaded tip through said aperture.

7. The key duplication system of claim 6, wherein the stylus and the abrasive cutting element have an identical cross-sectional profile and have respective engagement surfaces separated by a distance equal to a distance between a tip of an original key retained in said second clamp and a tip of a key blank retained in said first clamp.

8. The key duplication system of claim 6, further including a chuck attached to the rotary shaft and dimensioned to retain said abrasive cutting element during linear or angular manipulation of said carriage.

9. The key duplication system of claim 6, wherein said base defines first and second axially aligned bores and wherein said carriage defines a shaft dimensioned for sliding and pivoting movement within said first and second axially aligned bores, respectively.

10. The key duplication system of claim 6, wherein said base has a substantially planar bottom surface to accommodate placement on a horizontal support surface.

* * * * *